(12) United States Patent
Arold

(10) Patent No.: US 6,475,077 B2
(45) Date of Patent: Nov. 5, 2002

(54) HEATING OR AIR-CONDITIONING SYSTEM AND METHOD OF OPERATING SAME

(75) Inventor: Klaus Arold, Sindelfingen (DE)

(73) Assignee: DaimlerChrysler, Stuttgart (DE)

( * ) Notice: Subject to any disclaimer, the term of this patent is extended or adjusted under 35 U.S.C. 154(b) by 0 days.

(21) Appl. No.: 09/809,296

(22) Filed: Mar. 16, 2001

(65) Prior Publication Data

US 2001/0035019 A1 Nov. 1, 2001

(30) Foreign Application Priority Data

Mar. 16, 2000 (DE) .......................................... 100 12 975

(51) Int. Cl.[7] ................................................. B60H 3/00
(52) U.S. Cl. ........................................ 454/156; 165/42
(58) Field of Search ................................ 454/121, 156, 454/160, 161; 165/42, 43; 62/244

(56) References Cited

U.S. PATENT DOCUMENTS

| | | | | |
|---|---|---|---|---|
| 4,842,047 A | * | 6/1989 | Sakurada et al. ............. | 165/43 |
| 5,899,806 A | * | 5/1999 | Hase et al. .................. | 454/156 |
| 6,296,564 B1 | * | 10/2001 | Arold et al. ................. | 454/156 |

FOREIGN PATENT DOCUMENTS

DE 198 16 332 9/1999

* cited by examiner

Primary Examiner—Harold Joyce
(74) Attorney, Agent, or Firm—Crowell & Moring LLP

(57) ABSTRACT

A heating or air-conditioning system is provided for ventilating a passenger cell. The system includes an air-conditioning box in which a heat exchanger is accommodated and at least one air-mixing chamber is formed. The air-mixing chamber has an inflow opening for hot air flowing through the heat exchanger and an inflow opening for cold air flowing around the heat exchanger. The air-mixing chamber also has at least two outflow openings for ventilating the passenger cell. The system also has an air-mixing device which controls the inflow openings. In order to ensure pleasant ventilation for the occupant in every operating mode of the system and with little structural outlay, one outflow opening has arranged on it a restricting element which is intended for restricting the opening cross section and is actuated by the air-mixing device in such a manner that the outflow opening is restricted to the maximum when the hot-air inflow opening is opened up to the maximum and is completely opened up when the cold-air inflow opening is opened up to the maximum.

25 Claims, 1 Drawing Sheet

HEATING OR AIR-CONDITIONING SYSTEM AND METHOD OF OPERATING SAME

BACKGROUND AND SUMMARY OF THE INVENTION

This application claims the priority of German Patent Document 100 12 975.7, filed in Germany, Mar. 16, 2000, the disclosure of which is expressly incorporated by reference herein.

The invention relates to a heating or air-conditioning system for ventilating a passenger cell of a vehicle. Preferred embodiments of he invention relate to a heating or air-conditioning system for ventilating a passenger cell of a vehicle, having an air-conditioning box, in which a heat exchanger, through which air can flow, is accommodated and at least one air-mixing chamber is formed, the air-mixing chamber having an inflow opening for hot air flowing through the heat exchanger and an inflow opening for cold air flowing around the heat exchanger, and also having at least two outflow openings, in particular for the connection of ventilation ducts leading into the passenger cell, with said system also having an air-mixing device controlling opening cross sections of the inflow openings.

In a known heating or air-conditioning system of this type (German Patent Document DE 198 16 332 C1), for the purpose of keeping the air-conditioned zones in the passenger cell, for example, the central plane and the footwell, which are ventilated by the two outflow openings, at different temperatures, the air-mixing device has two separate closing members for the hot-air and cold-air inflow openings in the air-mixing space. The closing member for the cold-air inflow opening consists of two pivoting flaps which are arranged vertically one above the other, jointly cover the cold-air inflow opening and are offset with respect to each other by a fixed angle of rotation. This offset is undertaken in such a manner that when the closing member is opened, the upper air flap always opens up a larger opening cross section of the cold-air inflow opening than the lower air flap, with the result that temperature stratification of the mixed air arises in the mixed-air chamber and a ventilation duct, which is connected to the lower outlet opening, conducts hot air kept at a higher temperature than a ventilation duct which is connected to the upper outflow opening.

The reason for this temperature stratification in the air-mixing chamber is the finding that the occupant perceives a hot-air flow in the head region to be unpleasant, but perceives it to be pleasant in the foot region and so it is endeavored to keep the hot-air flow in the head region at a lower temperature level than the hot-air flow flowing into the footwell.

An object of the invention is to design a heating or air-conditioning system of the type mentioned at the beginning in such a manner that with little structural outlay ventilation, which is pleasant for the occupant, of the passenger cell, in particular of the rear area of the passenger cell, is ensured in all operating states of the system.

The invention achieves this object by providing a heating or air-conditioning system for ventilating a passenger cell of a vehicle, having an air-conditioning box, in which a heat exchanger, through which air can flow, is accommodated and at least one air-mixing chamber is formed, said air-mixing chamber having an inflow opening for hot air flowing through the heat exchanger and an inflow opening for cold air flowing around the heat exchanger, and also having at least two outflow openings, in particular for the connection of ventilation ducts leading into the passenger cell, with said system also having an air-mixing device controlling opening cross sections of the inflow openings, wherein one outflow opening has arranged on it a restricting element which is intended for restricting the opening cross section and is actuated by the air-mixing device in such a manner that the opening cross section of the outflow opening is restricted to the maximum when the hot-air inflow opening is opened up to the maximum, and is completely opened up when the cold-air inflow opening is opened up to the maximum.

The heating or air-conditioning system according to the invention has the advantage that the restrictable outflow opening reduces the quantity of hot air flowing into one ventilation duct, which is preferably used for ventilating the central plane in the rear area, in the heating mode and maximizes it in the cooling mode. Therefore, in the heating mode a great quantity of air which is kept at a uniform temperature flows into the footwell and only a reduced quantity flows into the central plane. In the heating mode, this results in a pleasant climate in the rear area without hot air unpleasantly streaming into the central plane and reaching as far as the head region. During cooling, in contrast, the cold air is distributed uniformly to both ventilation ducts and therefore uniformly to both ventilation regions. This is also advantageous, since cooling air in the central plane—in contrast to hot air—is perceived to be pleasant. The air distribution which is described is achieved without a great outlay and without an additional actuating drive as a result of the air-mixing device actuating the restricting element. The ventilation setting cannot be incorrectly operated.

Advantageous embodiments of the heating or air-conditioning system according to the invention together with expedient developments and refinements of the invention are specified herein and in the claims.

According to one advantageous feature of preferred embodiments of the invention, the air-mixing device has two separate closing members, one of which controls the opening cross section of the hot-air inflow opening and one the opening cross section of the cold-air inflow opening, the restricting element being forcibly coupled to one of the two closing members. This forcible coupling saves on a separate drive for the restricting element and—since there is no intervention option for the occupant—makes incorrect operation impossible.

According to another advantageous feature of preferred embodiments of the invention, the restricting element is designed as a pivoting slide which can be pivoted about a rotational spindle, which runs parallel to the perpendicular of the outflow opening, in a plane parallel to the outflow opening. Rotation of the pivoting slide causes the outflow opening to be covered to a greater or lesser extent, it being possible for the maximum coverage to be set in a very simple manner.

Other objects, advantages and novel features of the present invention will become apparent from the following detailed description of the invention when considered in conjunction with the accompanying drawings.

DETAILED DESCRIPTION OF THE DRAWINGS

Figure 1:
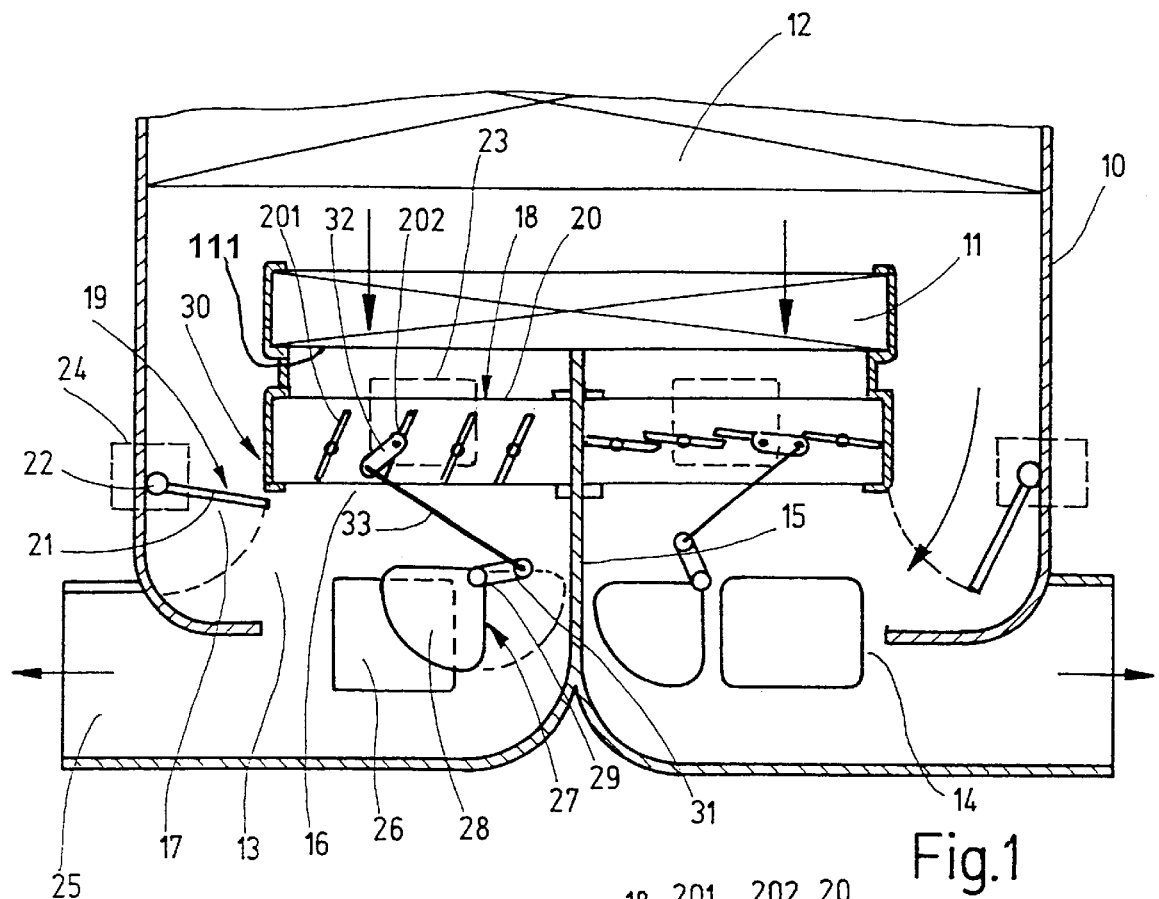
FIG. 1 shows part of a horizontally extending cross section of an air-conditioning box of a heating or air-conditioning system, constructed according to a preferred embodiment of the present invention.

The air-conditioning box 10, which is illustrated schematically and sectioned in plan view in FIG. 1, of a heating or air-conditioning system for a passenger cell of a vehicle is connected on the input side in known manner to a fan (not illustrated here). A heat exchanger 11, through which air can flow, is accommodated in the air-conditioning box 10 and in the version of an air-conditioning system an evaporator 12 is additionally arranged upstream of the heat exchanger, as seen in the direction of air flow. A heating medium flows through the heat exchanger 11 in a known manner, for which purpose use is conventionally made of the cooling water of the internal combustion engine of the vehicle. In the direction of air flow behind or downstream of the heat exchanger 11, two air-mixing chambers 13, 14 are formed in the air-conditioning box 10, the air-mixing chambers being arranged next to each other, being separated by a partition 15 and being respectively used to supply air to the right and left sides of the passenger cell of the vehicle. The air-mixing chambers 13, 14 are of identical design and equipped with identical elements for controlling the air, and so in the following reference is only made to the left-hand air-mixing chamber 13, but the same explanations also apply to the right-hand air-mixing chamber 14.

The air-mixing chamber 13 has a hot-air inflow opening 16 which is arranged behind the heat exchanger 11 and is branched off directly at the air-exit surface 111 of the heat exchanger 11, and a cold-air inflow opening 17 which is arranged to the side of the heat exchanger 11, bypassing the latter, and via which the cold air coming directly from the evaporator 12 and flowing around the heat exchanger 11 can flow into the air-mixing chamber 13, the air-mixing chamber also having an air-mixing device 30 which controls the quantity of air via the inflow openings 16, 17. Each inflow opening 16, 17 is assigned a respective closing member 18 or 19 of the air-mixing device 30 for the purpose of controlling the opening cross section. In the exemplary embodiment, the closing member 18 for the hot-air inflow opening 16 is designed as a louvered closure 20 which saves on structural space and has a multiplicity of narrow pivoting slats 201 which are arranged next to one another and are able in their entirety to cover the hot-air inflow opening 16. The closing member 19 for the cold-air inflow opening 17 is designed as a pivoting flap 21 which can be pivoted about a rotational spindle 22 between two end pivoting positions in which the cold-air inflow opening 17 is completely closed or completely opened. The louvered closure 20 is driven by a servomotor 23 and the pivoting flap 21 by a servomotor 24. The two servomotors 23, 24 are only indicated by dashed lines.

In order to ventilate the passenger cell with temperature-controlled air, the air-mixing chamber 13 has a plurality of outflow openings of which only the two outflow openings for the rear area of the passenger cell are illustrated in FIG. 1. The outflow opening 25 is used here for the connection of a ventilation duct which leads to the footwell of the rear area in the left-hand half of the passenger cell, and the outflow opening 26 is used for the connection of a ventilation duct which leads into the central plane of the rear area in the left-hand half of the passenger cell. The last-mentioned outflow opening 26 is assigned a restricting element 27 which is intended for restricting the opening cross section and which is actuated by the air-mixing device 30 in such a manner that the opening cross section of the outflow opening 26 is restricted to the maximum when the hot-air inflow opening 16 is opened up to the maximum (illustrated in the left-hand air-mixing chamber 13 in FIG. 1) and is completely opened up when the cold-air inflow opening 17 is opened up to the maximum (illustrated in the right-hand air-mixing chamber 14 in FIG. 1).

In the exemplary embodiment of FIG. 1, the restricting element 27 is designed as a pivoting slide 28 which can be pivoted about a rotational spindle 29, which runs parallel to the perpendicular of the outflow opening 26, in a plane parallel to the outflow opening 26. The pivoting slide 28 is forcibly coupled here to the closing member 18 for the hot-air inflow opening 16. For this purpose, a pivoting lever 31 is fastened rigidly to the rotational spindle 29 of the pivoting slide 28 and a pivoting lever 32 is fastened rigidly to the pivoting spindle 202 of a pivoting slat 201. A coupling rod 33 is coupled to the two free ends of the pivoting levers 31, 32. When the pivoting slats 201 are pivoted by means of the servomotor 23 the pivoting slide 28 is pivoted at the same time, specifically in such a manner that the closing of the pivoting slats 201 causes the pivoting slide 28 to be increasingly pivoted away from the outflow opening 26 until, in the closed position of the pivoting slats 201 (illustrated in the right-hand air-mixing chamber 14 in FIG. 1), the outflow opening 26 is completely opened up by the pivoting slide 28. The cold or fresh air flowing into the air-mixing chamber 13 when the pivoting flap 21 is open can now flow out over the full opening cross section of the outflow opening 26. The heating or air-conditioning system operates in the cooling-air or fresh-air mode.

In the heating mode, when the cold-air inflow opening 17 is closed to a greater or lesser extent by the pivoting flap 21, the hot-air inflow opening 16 is opened to a greater or lesser extent by pivoting of the pivoting slats 201. With increasing pivoting of the pivoting slats 201 the pivoting slide 28 is increasingly pushed over the outflow opening 26 and restricts its opening cross section. When the louvered closure 20 is completely opened, the pivoting slide 28 is pivoted to a maximum extent over the outflow opening 26, as is illustrated in the left-hand air-mixing chamber 13 in FIG. 1. The heating or air-conditioning system operates in the heating mode, and the hot-air flow emerging via the outflow opening 16 is substantially reduced, with the result that most of the quantity of hot air flows off via the outflow opening 25.

Figure 2:
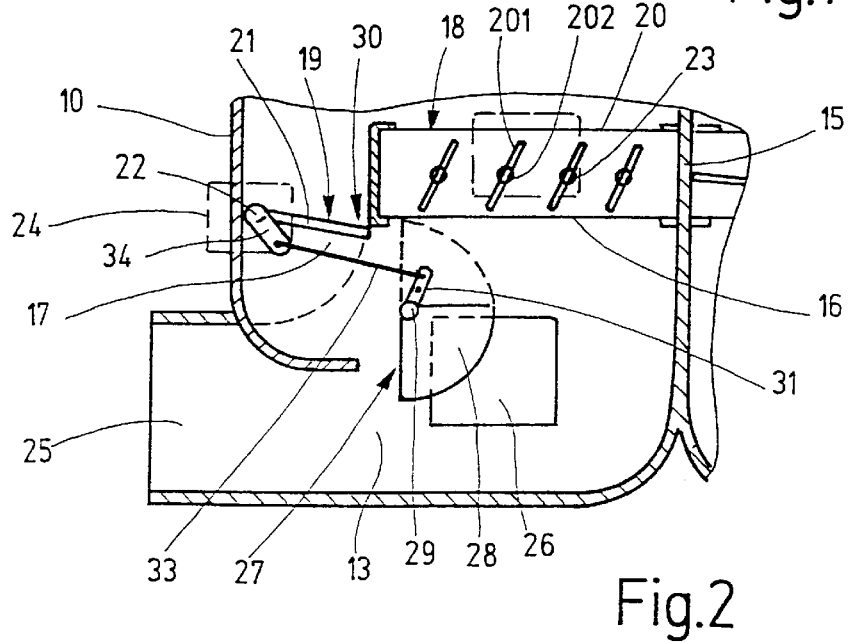
FIG. 2 shows part of the same illustration as in FIG. 1 with a modified air-conditioning box.

In the heating or air-conditioning system, part of which is illustrated in FIG. 2 together with its air-conditioning box 10, the forcible coupling between the air-mixing device 30 and the restricting element 27 is modified to the extent that the latter is coupled to the closing member 19 for the cold-air inflow opening 17. For this purpose, a pivoting lever 31 is again fastened rigidly to the rotational spindle 29 of the pivoting slide 28 and a pivoting lever 34 is fastened rigidly to the rotational spindle 22 of the pivoting flap 21 and the coupling rod 33 is coupled to the two free ends of the pivoting levers 31, 34. Since the actuation of the louvered closure 20 and of the pivoting flap 21 is synchronized via their servomotors 23 and 24 in such a manner that opening of the louvered closure 20 causes the pivoting flap 21 to close and vice versa, the functioning of the pivoting slide 28 and of the restricting element 27 is identical to the manner described in FIG. 1.

The invention is not restricted to the exemplary embodiments which have been described. Thus, the air-mixing device 30 for mixing the quantities of air flowing into the air-mixing chambers 13 and 14 via the hot-air inflow opening 16 and cold-air inflow opening 17, respectively, may also have just a single pivotable air-mixing flap which, in its one end position, completely closes the hot-air inflow opening 16 and completely opens up the cold-air inflow opening 17, and conversely, in its other end pivoting position, completely opens up the hot-air inflow opening 16 and completely closes the cold-air inflow opening 17. In this case, the restricting element 27 is coupled to the air-mixing flap in such a manner that in the heating position of the air-mixing flap, the outflow opening 26 is restricted and in the cooling position of the air-mixing flap the outflow opening 26 is completely opened up. If the evaporator 12 is omitted, the system which is described operates as a pure heating system and is used for ventilating the passenger cell with fresh air after the heat exchanger 11 has been turned off.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed:

1. Heating or air-conditioning system for ventilating a passenger cell of a vehicle, having an air-conditioning box, in which a heat exchanger, through which air can flow, is accommodated and at least one air-mixing chamber is formed, the said air-mixing chamber having an inflow opening for hot air flowing through the heat exchanger and an inflow opening for cold air flowing around the heat exchanger, and also having at least two outflow openings, in particular for the connection of ventilation ducts leading into the passenger cell, with said system also having an air-mixing device controlling opening cross sections of the inflow openings, wherein one outflow opening has arranged on it a restricting element which is intended for restricting the opening cross section and is actuated by the air-mixing device in such a manner that the opening cross section of the outflow opening is restricted to the maximum when the hot-air inflow opening is opened up to the maximum, and is completely opened up when the cold-air inflow opening is opened up to the maximum.

2. System according to claim 1, wherein the air-mixing device has two closing members, one of which controls the opening cross section of the hot-air inflow opening and one the opening cross section of the cold-air inflow opening, and wherein the restricting element is forcibly coupled to one of the closing members.

3. System according to claim 1, wherein the restricting element is designed as a pivoting slide which can be pivoted about a rotational spindle which runs parallel to a perpendicular of the outflow opening, in a plane parallel to the outflow opening.

4. System according to claim 2, wherein the restricting element is designed as a pivoting slide which can be pivoted about a rotational spindle which runs parallel to a perpendicular of the outflow opening, in a plane parallel to the outflow opening.

5. System according to claim 3, wherein the closing member for the hot-air inflow opening is designed as a louvered closure having a plurality of pivoting slats arranged next to one another, and wherein the pivoting slide is connected to at least one pivoting slat via a coupling rod.

6. System according to claim 4, wherein the closing member for the hot-air inflow opening is designed as a louvered closure having a plurality of pivoting slats arranged next to one another, and wherein the pivoting slide is connected to at least one pivoting slat via a coupling rod.

7. System according to claim 5, wherein respective pivoting levers are fastened rigidly to the rotational spindle of the pivoting slide and to the pivoting spindle of the pivoting slat, and wherein the coupling rod is coupled to the free ends of the pivoting levers.

8. System according to claim 6, wherein respective pivoting levers are fastened rigidly to the rotational spindle of the pivoting slide and to the pivoting spindle of the pivoting slat, and wherein the coupling rod is coupled to the free ends of the pivoting levers.

9. System according to claim 3, wherein the closing member for the cold-air inflow opening is designed as a pivoting flap, and wherein the pivoting slide is connected to the pivoting flap via a coupling rod.

10. System according to claim 4, wherein the closing member for the cold-air inflow opening is designed as a pivoting flap, and wherein the pivoting slide is connected to the pivoting flap via a coupling rod.

11. System according to claim 9, wherein respective pivoting levers are fastened rigidly to the rotational spindle of the pivoting slide and to the rotational spindle of the pivoting flap and the coupling rod is coupled to the free ends of the pivoting levers.

12. System according to claim 10, wherein respective pivoting levers are fastened rigidly to the rotational spindle of the pivoting slide and to the rotational spindle of the pivoting flap and the coupling rod is coupled to the free ends of the pivoting levers.

13. System according to claim 1, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

14. System according to claim 2, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

15. System according to claim 3, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

16. System according to claim 5, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

17. System according to claim 7, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

18. System according to claim 9, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

19. System according to claim 11, wherein ventilation ducts which can be connected to the outflow openings open into a rear area of the passenger cell, and wherein the outlet of the ventilation duct which is connected to that outflow opening which is provided with the restricting element is arranged in the central plane and the outlet of the other ventilation duct is arranged in the footwell of the rear area.

20. A vehicle air-conditioning system comprising:

a heat exchanger operable to heat air flowing therethrough, an air mixing chamber disposed downstream of the heat exchanger, a first air inflow opening communicating hot air from the heat exchanger to the mixing chamber, a second air inflow opening communicating cool air to the mixing chamber which bypasses the heat exchanger, a first outflow opening communicating air from the mixing chamber to a first passenger space region, a second outflow opening communicating air from the mixing chamber to a second passenger space region, an air mixing device controlling the first and second inflow openings, a first outflow opening control member operable to control an opening cross section of the first outflow opening, and a coupling member connecting the air mixing device and first outflow opening control member such that the opening cross section of the first outflow opening is maximally restricted when the first air inflow opening is maximally enlarged and is maximally enlarged when the first air inflow opening is maximally restricted.

21. A vehicle air-conditioning system according to claim 20, wherein said first passenger space region is a central passenger space region and said second passenger space region is a footwell region.

22. A vehicle according to claim 20, wherein said coupling member is a lever connecting a control lever of a restricting flap at the first outflow opening and a second control lever of control flap means at one of said inflow openings.

23. A method of operating a vehicle air-conditioning system which includes:

a heat exchanger operable to heat air flowing therethrough, an air mixing chamber disposed downstream of the heat exchanger, a first air inflow opening communicating hot air from the heat exchanger to the mixing chamber, a second air inflow opening communicating cool air to the mixing chamber which bypasses the heat exchanger, a first outflow opening communicating air from the mixing chamber to a first passenger space region, a second outflow opening communicating air from the mixing chamber to a second passenger space region, an air mixing device controlling the first and second inflow openings, and a first outflow opening control member operable to control an opening cross section of the first outflow opening, said method comprising:

controlling the opening cross section of the first outflow opening by mechanically coupling the air mixing device and first outflow opening such that the opening cross section of the first outflow opening is maximally restricted when the first air inflow opening is maximally enlarged and is maximally enlarged when the first air inflow opening is maximally restricted.

24. A vehicle air-conditioning system according to claim 23, wherein said first passenger space region is a central passenger space region and said second passenger space region is a footwell region.

25. A vehicle according to claim 20, wherein said controlling coupling is performed with a lever connecting a control lever of a restricting flap at the first outflow opening and a second control lever of control flap means at one of said inflow openings.

* * * * *